United States Patent Office 2,762,636
Patented Sept. 11, 1956

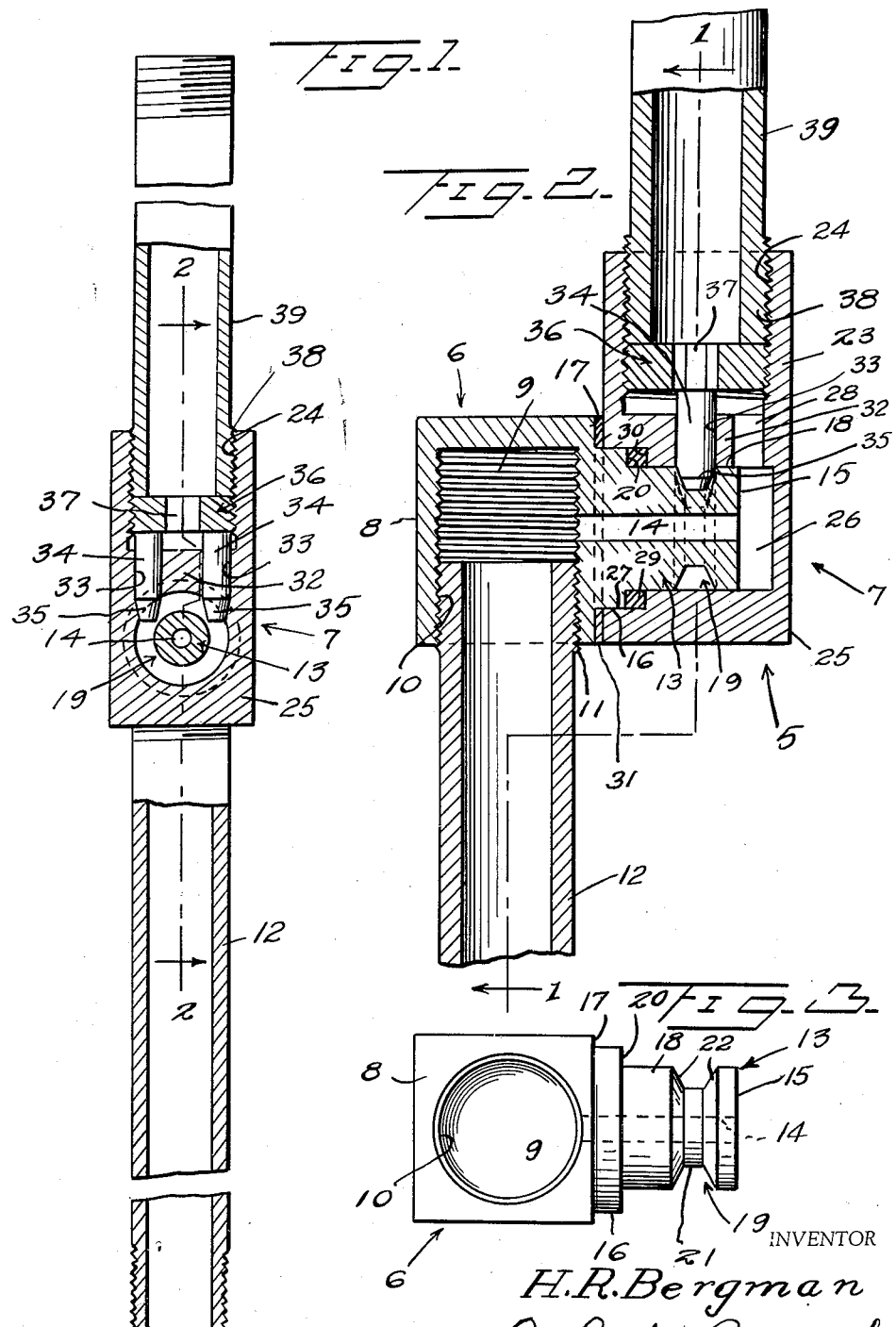

2,762,636

ARTICULATED CONDUIT COUPLING WITH INTERIOR DETENT

Herbert R. Bergman, Maria Stein, Ohio

Application March 31, 1954, Serial No. 420,021

7 Claims. (Cl. 285—184)

This invention relates to a novel articulated coupling for connecting rigid conduit sections and by means of which the conduit sections may be positioned at different angles and retained in different angularly adjusted positions.

More particularly, it is an object of the invention to provide a jointed coupling connecting and forming a communicating passage between sections of a conduit and whereby the axes of the conduit sections thus joined may be adjusted to and retained in various angular positions including a folded position wherein the conduit sections project in the same direction from the coupling.

A further object of the invention is to provide an articulated coupling of extremely simple construction composed of a minimum number of parts yet which will be extremely efficient and durable in accomplishing its intended result and which may be quickly and easily assembled with sections of a conduit to be flexibly joined thereby.

A further object of the invention is to provide a jointed coupling possessing a unique cooperation between the parts thereof whereby certain of the parts dually function for maintaining the coupling assembled and for regulating the amount of torque required to effect angular adjustment of the coupling sections.

Various other objects and advantages of the invention will hereinafter become more fully apparent from the following description of the drawing, illustrating a presently preferred embodiment thereof, and wherein:

Figure 1 is a sectional view partly in elevation showing the joint assembled between two conduit sections connected thereby, and taken substantially along a plane as indicated by the line 1—1 of Figure 2;

Figure 2 is an enlarged sectional view, partly in elevation, of the coupling and portions of the conduit sections joined thereby, taken substantially at a right angle to Figure 1 along a plane as indicated by the line 2—2 of Figure 1, and Figure 3 is a bottom plan view of one of the coupling sections.

Referring more specifically to the drawing, the articulated coupling in its entirety and comprising the invention is designated generally 5 and includes a male section, designated generally 6, and a female section, designated generally 7.

The male coupling section 6 comprises an elongated casting preferably formed of metal having an enlarged end 8 which is preferably noncircular both longitudinally and transversely of the section 6, as illustrated in Figures 2 and 3. The end portion 8 is provided with a recess or socket 9 which is disposed laterally of the section 6 and which has an outwardly opening end portion 10 which is internally threaded to receive an externally threaded end 11 of a rigid conduit section 12. The other end of the male coupling section 6 is of reduced cross sectional size and of circular cross section to provide a stepped stem 13 having a bore 14 extending longitudinally therethrough. One end of the bore 14 opens outwardly of the distal end 15 of the stem 13 and the other end of said bore opens into the recess or socket 9 between the closed end thereof and the inner threaded end of the conduit section 12. The stem 13 includes an annular portion 16 located adjacent the end 8 of the coupling section 6 and which is of larger diameter than the remainder of the stem 13. The part of the end portion 8 disposed around the stem portion 16 forms a surrounding shoulder 17. The portion 18 of the stem 13 which extends from its enlarged portion 16 to its distal end 15 is of uniform diameter except for an annular groove 19, which is formed therein adjacent the distal end 15 of the stem. The enlarged stem portion 16 forms an annular shoulder 20 around the adjacent end of the stem portion 18. As best illustrated in Figure 3, the groove 19 includes a substantially flat bed 21 and side walls 22 which converge inwardly relative to one another toward said bed 21.

The female coupling section 7 likewise preferably comprises an elongated metal casting which is preferably of rectangular cross section and which includes an outer end or portion 23 having a relatively large internally threaded recess or socket 24. The other inner end 25 of the female section 7 is provided with a transversely extending recess or socket 26 of circular cross section having an enlarged outer end 27 which opens outwardly thereof and which is of a length greater than the length of the stem portion 16. The section 7 is also provided with a longitudinally extending bore or passage 28 which communicates at its ends with the inner ends of the recesses or sockets 24 and 26.

The stem portion 18 fits turnably in a part of the recess or socket 26 and the stem portion 16 turnably engages in the outer socket portion 27. A gasket or packing ring 29 is disposed around the inner end of the stem portion 18 and within the inner part of the portion 27 and is compressed between the shoulder 20 and a shoulder 30 of the recess 26, which shoulder 30 is disposed at the inner end of the recess portion 27. The stem 13 is of a length less than the length of the recess or socket 26 so that when fully inserted therein, as illustrated in Figure 2, the distal end 15 of the stem will be spaced from the inner end of the socket 26 so as not to seal the passage 28. The shoulder 17 may abut against the side face of the coupling section 7 through which the recess portion 27 opens but a gasket 31 is preferably interposed between said face and the shoulder 17.

As seen in Figures 1 and 2, an intermediate transverse wall portion 32, in which the passage 28 is formed, is provided with two spaced substantially parallel bores 33, preferably of circular cross section, both of which open into the inner end of the longitudinal socket 24 and into the socket or recess 26, intermediate of the ends of the latter. A pair of pins 34 of circular cross section are slidably and removably mounted in the bores 33 and have tapered ends 35 in the form of truncated cones. As seen in Figures 1 and 2, the pins 34 are longer than the bores 33 and have opposite flat ends disposed in the recess or socket 24.

An adjustable pin retaining member 36, in the form of a relatively thick disk having a threaded periphery, threadedly fits into the threaded socket 24 and is removably and adjustably mounted therein. The pin retaining member 36 has a noncircular center opening 37 to receive any suitable turning tool, not shown, by means of which the retaining member may be applied to or removed from the threaded socket 24 and adjusted therein. As seen in Figure 1, the pins 34 are laterally spaced relatively to the axis of the stem 13 and recess 26 so as to straddle the central portion of said stem and so that the ends of the pins which are disposed in the socket 24, straddle the opening 37 and abut against the inner surface of the retaining member 36. The taper of the pin ends 35 corresponds to the taper of the groove walls 22 but said pin ends are slightly larger in diameter than the spacing between the walls 22. Accordingly, when the retaining member 36 is turned in a direction to be advanced inwardly of the socket 24 it will force the ends 35 into the groove 19, as illustrated in Figures 1 and 2, and so that the tapered pin ends 35 will have frictional engagement with the groove walls 22 to an extent varying depending upon the extent that the retaining member 36 is advanced into the socket 24. It will be understood that before the pins 34 are applied to the bores 33, that the stem 13 is inserted into the recess 26, as illustrated in Figure 2, and to position the groove 19 in registration with the bores 33. After proper adjustment of the retaining member 36 so that a desired amount of torque will be required to turn either of the coupling sections 6 or 7 relatively to the other, an externally threaded end 38 of a second conduit section 39 is threaded into the outer end of the socket 24 and is advanced into abutting engagement with the outer side of the retaining member 36 to retain said member 36 in its desired adjusted position.

From the foregoing it will be readily apparent that the coupling 5 when assembled as illustrated in Figures 1 and 2 and with the conduit sections 12 and 39 connected thereto, will form a communicating passage through said coupling between the conduit sections. A liquid may flow through the bore 14 between the recess 9 of the male section 6 and the inner end of the recess 26 of the female section 7. Liquid may likewise flow through the passage 28, the inner end of the recess 24 and the opening 37 in either direction between the inner end of the recess 26 and the conduit section 39. It will be readily apparent that the female section 7 may be rotated on the stem 13 of the male section 6 or said male section 6 may be swivelled relatively to the female section 7 by rotation of the stem 13 in the recess or socket 26, so that the conduit sections 12 and 39 may be positioned at any desired angle relatively to one another. This includes turning of either coupling section relatively to the other through an arc of 360°. Thus, if desired, the conduit sections 12 and 39 may be disposed to extend in the same direction from the coupling 5 in a folded position of said sections of the conduit, as for example when the conduit sections and couplings are stored. It will also be readily apparent that the amount of torque required to turn either conduit section relatively to the other may be varied by tightening or loosening the retaining member 36 to vary the frictional engagement of the pin ends 35 against the groove walls 22, so that the conduit sections and coupling sections may be effectively maintained in any desired adjusted position against casual displacement.

Various modifications and changes are contemplated and may obviously be resorted to, without departing from the spirit or scope of the invention as hereinafter defined by the appended claims.

I claim as my invention:

1. An articulated conduit coupling comprising a female coupling section and a male coupling section, each of said sections comprising an elongated casting, said female coupling section having a longitudinal socket opening outwardly of an outer end thereof and a cylindrical transverse socket opening outwardly of a side of an inner end thereof, said female coupling section including a transverse wall portion separating said sockets and provided with a passage communicating with portions of the inner ends of the sockets, said male coupling section having an outer end provided with a transverse socket having a conduit receiving end opening outwardly of a side of the male section, a cylindrical stem of circular cross section constituting the opposite inner end of said male coupling section and sized to swivelly engage in the transverse socket of the female coupling section and combining therewith to form a swivel connection between the coupling sections, said stem having a bore extending longitudinally therethrough, one end of said bore opening into the inner end of the transverse socket of the female coupling section and the other end of said bore opening into the socket of the male coupling section inwardly with respect to the conduit receiving open end of said last mentioned socket, said stem being provided with an outer annular groove adjacent its distal end, means extending slidably through said transverse wall and engaging in said groove for retaining the coupling sections in swivelly connected relationship, retaining means detachably and adjustably mounted in said longitudinal socket and engaging and retaining the first mentioned means in engagement with the stem groove, and the outer portion of said longitudinal socket, outwardly with respect to said retaining means, defining a conduit end receiving portion.

2. An articulated coupling as in claim 1, said groove having inwardly converging side walls, said first mentioned means including a truncated cone tapered to fit snugly between said walls and of larger diameter than the spacing between the walls for frictional engagement therewith and for varying the torque required to turn either of the coupling sections relatively to the other depending upon the adjustment of said retaining means.

3. An articulated coupling as in claim 1, said groove including inwardly converging side walls, said first mentioned means comprising pins having corresponding tapered ends of turncated cone shape extending into said groove and frictionally engaging the side walls thereof, said retaining means comprising an externally threaded disk threadedly engaging in the longitudinal socket and bearing against opposite ends of said pins for varying the frictional engagement of the tapered pin ends with the groove walls, said disk having a central opening of noncircular cross section disposed between said pins and constituting a passage between the inner and outer ends of said longitudinal socket when the disk is applied thereto.

4. An articulated coupling as in claim 3, said disk being adapted to be retained in different adjusted positions in the longitudinal socket by engagement with an end of a conduit threadedly secured in said outer socket portion.

5. An articulated coupling as in claim 1, said transverse socket being of stepped construction including an enlarged outwardly opening end portion, said stem being of stepped construction and having an inner portion of larger diameter than the remainder of the stem and sized to turnably fit the enlarged outer end of said transverse socket.

6. An articulated coupling as in claim 5, the enlarged portion of said transverse socket being of greater length than the enlarged portion of said stem, and a sealing gasket disposed around a part of the restricted portion of the stem and contained in the inner end of the enlarged portion of said transverse socket.

7. An articulated coupling as in claim 1, said transverse socket of the female coupling section being of a greater length than said stem whereby the distal end of the stem is spaced from the inner end of said socket, and said passage of the transverse wall opening into said transverse socket of the female coupling section between its inner end and the distal end of said stem.

References Cited in the file of this patent

UNITED STATES PATENTS 2,119,987    Follet                       June 7, 1938